United States Patent
Li et al.

(10) Patent No.: US 11,245,791 B2
(45) Date of Patent: Feb. 8, 2022

(54) DETECTING ROBOCALLS USING BIOMETRIC VOICE FINGERPRINTS

(71) Applicant: Marchex, Inc., Seattle, WA (US)

(72) Inventors: William Li, Seattle, WA (US); Nam Kim, Seattle, WA (US); Michael Pruitt, Seattle, WA (US); Mark Corley, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

(21) Appl. No.: 17/086,284

(22) Filed: Oct. 30, 2020

(65) Prior Publication Data

US 2021/0136200 A1 May 6, 2021

Related U.S. Application Data

(60) Provisional application No. 62/928,222, filed on Oct. 30, 2019.

(51) Int. Cl.
*H04M 3/436* (2006.01)
*H04M 3/42* (2006.01)
*H04M 3/22* (2006.01)
*G10L 17/26* (2013.01)

(52) U.S. Cl.
CPC ........... *H04M 3/4365* (2013.01); *G10L 17/26* (2013.01); *H04M 3/2281* (2013.01); *H04M 3/42042* (2013.01); *H04M 3/42059* (2013.01)

(58) Field of Classification Search
CPC ............. H04M 3/4365; H04M 3/2281; H04M 3/42042; H04M 3/42059; G10L 17/26

USPC ...................................................... 455/414.1
See application file for complete search history.

(56) References Cited

U.S. PATENT DOCUMENTS

| | | | |
|---|---|---|---|
| 10,182,148 B2* | 1/2019 | Winkler | H04L 63/10 |
| 10,958,784 B1* | 3/2021 | Way | G06N 5/04 |
| 2016/0255194 A1* | 9/2016 | Efrati | H04M 3/42059 370/259 |
| 2017/0134574 A1* | 5/2017 | Winkler | H04M 3/4211 |
| 2017/0353602 A1* | 12/2017 | DeLuca | H04W 8/183 |
| 2018/0288230 A1* | 10/2018 | Baughman | H04M 7/0033 |
| 2021/0136208 A1* | 5/2021 | Adibi | G06N 5/04 |
| 2021/0144248 A1* | 5/2021 | Hart | H04M 3/5235 |

* cited by examiner

*Primary Examiner* — Binh Kien Tieu
(74) *Attorney, Agent, or Firm* — Perkins Coie LLP

(57) ABSTRACT

The disclosed system and method detect robocalls using biometric voice fingerprints. The system receives audio input representing a plurality of telephone calls. For at least a portion of the telephone calls, the system analyzes the received audio based on a voice biometrics detection model to identify one or more biometric indicators characterizing a speaker in the analyzed telephone call. The system generates and stores a voice fingerprint characterizing the speaker based on the biometric indicators, and a time of the analyzed telephone call. The system analyzes stored voice fingerprints and times corresponding to speakers in the analyzed telephone calls to determine a frequency of occurrence of each voice fingerprint within an analyzed timeframe. If the frequency of occurrence of a voice fingerprint exceeds a threshold call quantity within the analyzed timeframe, the voice fingerprint is characterized as being associated with a robocaller.

20 Claims, 5 Drawing Sheets

DETECTING ROBOCALLS USING BIOMETRIC VOICE FINGERPRINTS

CROSS-REFERENCE TO RELATED APPLICATION(S)

This application claims the benefit of U.S. Provisional Patent Application No. 62/928,222, entitled "SPEAKER VOICE BIOMETRIC IDENTIFICATION FOR SPAM BLOCKING," filed Oct. 30, 2019, which is incorporated herein by reference in its entirety.

BACKGROUND

Robocalls and other spam calls are a widespread issue in the telecommunications space. These calls are often generated by humans or machines (e.g., by using Text-To-Speech (TTS) to convert text to recorded audio) and subsequently injected into a telecommunications system to mimic a human calling another party (e.g., an individual or business). Robocalls are typically prerecorded so that they can be played repeatedly and in a high volume of phones calls placed to many individuals or businesses. As robocalls have become more frequent, they are increasingly perceived as a nuisance because they (a) consume a large amount of time from individuals or businesses that receive and field the calls, (b) consume telephony network resources, and (c) increasingly are used for fraudulent purposes. Furthermore, certain robocalls are illegal when improperly used to solicit business or generate a profit. Accordingly, there is a need to detect and remove these calls from the telecommunications space.

DETAILED DESCRIPTION

Figure 1:
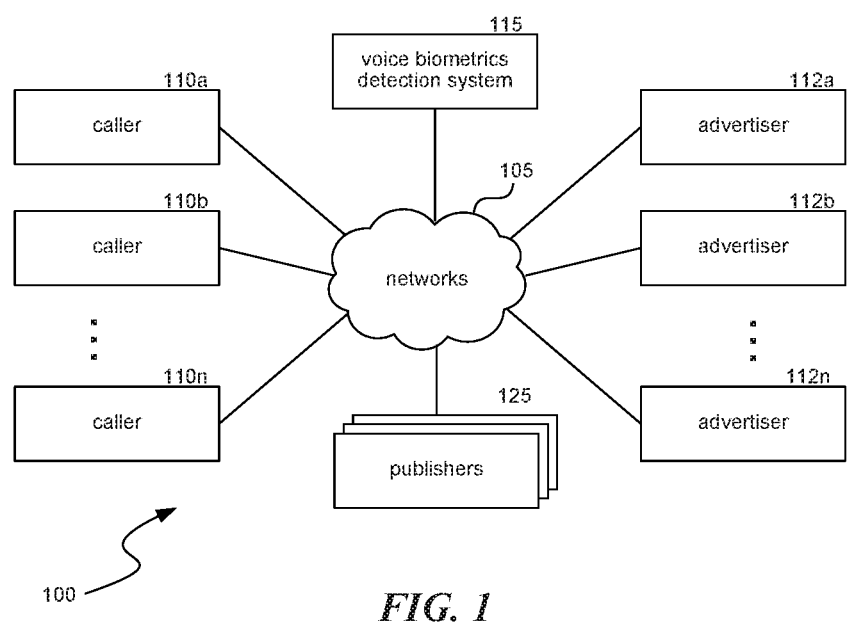
FIG. 1 is a block diagram illustrating an example environment in which a voice biometrics detection system operates.

A system and methods are disclosed for identifying robocallers and other spam or undesirable callers that place calls to consumers or businesses over telecommunications systems. The system utilizes an Artificial Intelligence (AI)-trained voice biometrics detection model to extract voice biometrics (e.g., biometric indicators) of a speaker within a phone call. Utilizing the voice biometrics, the system generates a voice fingerprint that characterizes the speaker. The generated voice fingerprint may be used for multiple purposes by the system. The system can compare a generated voice fingerprint to stored datasets of known callers and caller type types (e.g., robocallers, spam callers, legitimate callers, etc.) to determine whether a particular call is legitimate or likely a robocaller or spam caller. The system can also use the generated voice fingerprint to monitor and detect a frequency of a particular caller on a telecommunications network. If the frequency of a detected caller exceeds certain thresholds, the system may categorize the caller as a likely robocaller. In some implementations, the disclosed system further takes corrective action based on identifying a robocaller or other spam caller. For example, when the system determines, based on the voice fingerprint, that the speaker is a robocaller, spam caller, or other undesirable caller, the system may terminate the call, display a warning, request a call recipient to confirm that the call is spam, or take other corrective action.

To facilitate the detection of robocalls, the system generates a dataset of voice biometrics that characterize a plurality of known callers, and further generates a dataset of voice fingerprints based on the voice biometrics. Call audio data that is analyzed by the system can contain verbal speech and/or non-verbal speech patterns uttered by humans or by machines configured to mimic or simulate the human voice. From the analyzed call audio data, the system extracts unique characteristics for each speaker that can be used to generate voice fingerprints (i.e., a profile, signature, or set of characteristics that identifies or characterizes the speaker). Characteristics that identify or characterize a human speaker include, for example, volume, pitch, speaking rate, pauses between each utterance, tonal properties, etc., that may be influenced, e.g., by the gender, age, ethnicity, language, and regional location of the speaker. The same characteristics also identify or characterize audio simulating human speech, e.g., as produced by a robocaller. Thus, the system uses characteristics of call audio data in a phone call to generate a voice fingerprint characterizing a speaker (whether human or machine simulation), which can be used to detect that speaker in other phone calls.

As used herein, "identify," with respect to a speaker, means that the system may detect that the same speaker is likely present in two or more phone calls or other audio inputs, whether or not the specific identity of the speaker is known. In other words, the system may detect the presence of the same speaker in multiple audio sources by matching the voice fingerprint of the speaker. The system can determine matches between two or more voice fingerprints, for example, by calculating a similarity score between the fingerprints. A match is found when the compared speaker fingerprints are either exact matches or are sufficiently close that the probability that they represent the same speaker is very high (e.g., greater than 85%-90%). Thresholds for matching can be configurable or based on empirical data, such as training data. By matching voice fingerprints, the system can identify a speaker even though the spoken words or sentences may differ from speech used to generate a voice fingerprint because voice biometrics are largely consistent with respect to a speaker. In other words, the system can extract and use biometrics to generate voice fingerprints that identify the same speaker regardless of the content of the received speech or other audio information.

The system employs AI techniques, which may include artificial neural networks, to identify voice biometrics characterizing a speaker. The system receives live or recorded audio containing real or simulated human speech, and extracts voice biometrics from the received audio using AI models and data processing techniques. The extracted voice biometrics are expressed or represented in various data formats or structures, such as compressed and/or uncompressed data vectors or arrays. The AI data processing techniques include deep learning techniques that use training data (e.g., audio data) to process, extract, learn, and identify unique characteristics and biometrics of audio data associated with a speaker (collectively, "biometrics"). If the number of measured biometrics is sufficiently large, the combination of biometrics associated with an individual speaker will be sufficient to identify that speaker in a subsequent audio sample with enough accuracy that the likelihood of confusion with other speakers is very small. The degree of accuracy can be based on, for example, semi-supervised training of the system, configuration of the system (e.g., for a level of accuracy that is acceptable to a user), or empirically derived thresholds. Based on the training data, the AI data processing techniques generate voice biometrics detection models that, when applied to call audio data, identify and extract voice biometrics of speech in the analyzed call audio data. The extracted biometrics allow a speaker's speech to be compared with previously analyzed speech by comparing voice fingerprints generated based on extracted biometrics. In other words, the system uses AI data processing techniques and training data to generate models capable of identifying a speaker based on a biometric-based voice fingerprint.

The system generates a dataset of voice fingerprints associated with known speakers (i.e., known individuals each having a voice fingerprint) and classified into certain caller types (e.g., classified as spammers, robocallers, or known legitimate callers). To generate voice fingerprints of known speakers, the system captures or receives utterances or other audio of known speakers. The system uses an AI-generated biometrics detection model to extract voice biometrics associated with the known speakers from the captured or received audio. The system stores the extracted speaker biometrics in a known speaker biometric dataset. In other words, the system creates and stores voice fingerprints associated with known speakers in the audio based on extracted voice biometrics. The stored fingerprints can be associated with a caller type, such as spammers, robocallers, known legitimate callers, etc.

Depending on federal, state or local regulations, the voice fingerprints may be stored without personally identifiable information such that they are not correlated with identifiable individuals (if human). Alternatively, the voice fingerprints may be stored for a limited amount of time for use in detecting spammers and robocallers, after which the fingerprints may be deleted. By limiting either the information stored with biometric information or the length of storage, the system ensures compliance with any privacy laws or other rules governing storage of information characterizing telecommunications traffic.

The system may use a stored voice fingerprint to identify that audio with characteristics matching the stored fingerprint is present on a different telephone call. Detection of a stored voice fingerprint in another call (e.g., matching a voice fingerprint of a known speaker with a voice fingerprint of an unknown speaker) indicates that it is likely the same speaker that is speaking on the other call. The generated dataset of known speaker fingerprints may be used for detecting unwanted callers and, based on that detection, taking corrective steps such as "allowlisting" or "denylisting" phone numbers, requiring additional verification or authentication steps, handling the call differently, and so on as described in additional detail herein.

In an example implementation of the system, the system receives audio (e.g., a recorded or live phone call that has not previously been analyzed by the system), and uses the AI-generated models to extract voice biometrics from call audio data in the call and generate a voice fingerprint based on the extracted voice biometrics. The system searches for voice fingerprints in the known speaker dataset that match the generated voice fingerprint. For example, the system calculates a probability that the generated voice fingerprint matches one or more voice fingerprints stored in the known speaker dataset. Upon determining a match between the generated voice fingerprint from the call audio data and one or more voice fingerprints stored in the known speaker dataset, the system determines that the speaker in the call audio data and the identified speaker in the dataset of known speakers are the same. Because known speakers in datasets may also have been previously classified by the system with a caller type, the system can use that classification (e.g., a robocaller, a spam caller, a legitimate caller, and so on) to manage interactions with the caller on the received audio or to take further steps based on the classification. For example, the system may take various actions based on this determination, e.g., to request confirmation from a call recipient that the caller is of the known caller type, and so on.

The system determines a match between two or more voice fingerprints by calculating a similarity score indicating a degree of similarity or dissimilarity of the two or more voice fingerprints. To generate a similarity score, the system employs various types of similarity measures, such as Euclidean similarity measures, probabilistic linear discriminant analysis (PLDA), and so forth. Based on the similarity measures, the system generates a similarity score. If the similarity score exceeds a threshold score, then the system determines that there is a match (i.e., that a speaker in received audio is the same as a speaker corresponding to a stored voice fingerprint). The threshold can be configurable, such as by a user, whereby the user can specify a degree of certainty to determine a match. In this and other implementations, the threshold can be empirically derived.

In some implementations, the described system can maintain different treatments associated with different caller types, such as an "allowlist" of known legitimate callers and a "denylist" of known spam or robocallers. The system can be configured to, for example, automatically block or flag denylisted callers and automatically allow or pass allowlisted callers. These and other treatments can be maintained by the system, or generated by the system, e.g., based on the ability of the system to identify known speakers using voice biometric identification. An allowlist or denylist can track the identity of callers or speakers based on phone number, speaker voice fingerprints, or other identifiers associated with those callers or speakers.

A caller or speaker allowlist can, for example, include legitimate robocallers or other frequent or repeat callers for which no corrective action is taken. One example of a robocaller that the system may allow is an automated messaging system used to notify clients or patients of upcoming appointments, such as for dental or medical appointments. To classify such calls as legitimate, the system can add the speaker voice fingerprint associated with such calls to the caller allowlist. A caller or speaker allowlist can include phone numbers, voice fingerprints, and/or other identifying information to identify the speaker or caller. The system does not take corrective action upon confirming that a call or speaker in a call matches a speaker or caller included in an allowlist.

The system may also store a phone number or voice fingerprint or other identifier associated with known callers in a denylist. For example, the system may determine a speaker in a phone call to be associated with a robocaller. Based on this determination, the system may take corrective action on calls that are associated with that voice fingerprint or other identifier. The system may automatically take corrective action on all phone calls from a phone number or all phone calls that match a voice fingerprint or contain other identifier present in a denylist. As described elsewhere herein, corrective action may include blocking or disconnecting the phone calls.

A phone number, voice fingerprint, or other identifier included in a stored allowlist or denylist can later be removed from such list. For example, the system can remove a phone number or fingerprint based on time (e.g., after a period of time has elapsed from when the phone number or fingerprint was added to the list). The system can also remove a phone number or fingerprint based on the frequency the phone number is used to place calls or that the voice fingerprint appears in calls, as measured during a particular timeframe. In other words, the system can reassess speakers or callers placed on an allowlist or denylist based on, e.g., the age of data used to originally place the speaker or caller on the list, lack of recent call data, changes in call frequency or other call behavior, or other factors. By continually or periodically reassessing whether speakers or callers have been appropriately classified as being on an allowlist or denylist, the system attempts to apply an appropriate treatment of speakers and callers over time. Timeframes for reassessing allowlists or denylists can be configurable or empirically derived. For example, the system can be configured to reassess lists every 30 days, 60 days, 90 days, etc., based on preferences or empirical information, e.g., showing a likely frequency of reassessment that will detect callers to be classified on each list to an acceptable degree of accuracy.

Thus, the system and methods identify spam callers, robocallers, and other undesirable callers using voice biometrics, voice fingerprints, and AI data processing models to analyze real and simulated human speech and other call characteristics. Upon identifying the undesirable caller or callers, the system and methods can take corrective action such as by generating and sending a warning or other indication to a call recipient, requesting confirmation from a call recipient that a call is spam, disconnecting a call, or requesting for a call recipient to disconnect a call. The system can also automatically block or flag denylisted callers or automatically allow allowlisted callers.

Advantages of the system include improved ability to identify spam and robocallers using large datasets and AI data processing models. For example, the system and methods include automated processes for identifying spam and robocallers and taking appropriate corrective action to respond to the callers (e.g., by blocking or disconnecting a call), thus, saving efforts that a business may otherwise spend responding to spam and robocallers, reducing employee time spent responding to robocalls, conserving telephony network resources that would otherwise be used by robocallers, and reducing the risk of fraud perpetrated by spam callers and robocallers. In addition, the system increases accuracy and reliability of robocaller detection, e.g., by relying on a model trained using large datasets and checking for accuracy using confirmation requests sent to call recipients. Furthermore, the system includes methods for identifying new, unknown robocalls, e.g., by analyzing frequency of occurrence of voice fingerprints across telephone calls during one or more analyzed time periods (for example, to detect multiple, concurrent or near-concurrent calls including the same speaker). By detecting robocallers using the disclosed voice fingerprints, the system identifies robocallers even when a caller takes measures to conceal its identity, e.g., by "spoofing" or blocking caller identification ("caller ID").

One skilled in the art will appreciate that the system is not limited to the described application or applications herein. For example, some implementations of the system can automatically identify and differentiate between customers and agents (e.g., sales or customer service representatives, and so on) on the same telephone call. In other words, the system can be applied to separate a caller channel and an agent channel in a telephone call using voice biometrics. As an additional example, the system can identify or authenticate the identity of a caller to a call center, e.g., where the call center requires caller authentication to disclose confidential or sensitive information. In the example implementation, the system can augment or replace existing methods of caller identity verification or authentication (e.g., the system can serve as an alternative to answering security questions or providing other identifying information).

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented herein is intended to be interpreted in its broadest reasonable manner, even though it is being used in conjunction with a detailed description of certain specific embodiments of the invention.

Suitable Environments

FIG. 1 is a block diagram illustrating an environment 100 in which a voice biometrics detection system 115 operates. Although not required, aspects and implementations of the system may be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and methods can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

In the environment 100, the voice biometrics detection system 115 is able to receive information associated with calls made by one or more callers 110 (shown individually as callers 110a-110n) via one or more networks 105. The voice biometrics detection system 115 is also able to receive information associated with one or more advertisers 112 (shown individually as advertisers 112a-112n) via the one or more networks 105. A caller 110 may be an individual person, whether operating in an individual capacity or as part of a business, a governmental agency, or any other entity capable of initiating telephone calls for any reason, including calls initiated in response to advertisements for products or services. A caller 110 may also be, for example, a robocaller or other computerized device for simulating human speech or transmitting recorded speech. An advertiser 112 similarly may be an individual person, a business, a governmental agency, or any other entity capable of receiving telephone calls in response to advertisements that are placed by the advertiser. The voice biometrics detection system 115 receives an indication when telephone calls are made from the callers 110 to the advertisers 112, either by directly monitoring to detect when a call is made, by receiving recorded audio from a call concurrently during the call or after the call has been completed, or by other process. The system may process such calls (i.e., "received calls") to determine voice biometrics of speakers within a call, to assess probabilities of whether the call is spam (e.g., of whether the call is a robocall), and/or to take corrective action, if necessary, depending on the call assessment.

Networks 105 are any network suitable for communicatively coupling the callers 110 and the advertisers 112, such as a Voice over Internet Protocol (VoIP) network, a cellular telecommunications network, a public-switched telephone network (PSTN), any combination of these networks, or any other suitable network that can carry data and/or voice telecommunications. Networks 105 also allow information about calls between the callers 110 and advertisers 112, including the audio associated with such calls, to be conveyed to voice biometrics detection system 115, The callers 110, advertisers 112, and voice biometrics detection system 115 may also communicate with each other and with publishers 125 via public or private networks 105, including for example, the Internet. The voice biometrics detection system 115 may provide an interface such as a website or an application programming interface (API) that allows system users to access the voice biometrics detection system 115, and which provides data regarding the voice biometrics detection services and functions. The publishers 125 provide content that includes phone numbers or other identifiers that allow callers to call advertisers. The advertisers may have dedicated phone numbers that are advertised to potential callers, or the advertisers may use transitory call tracking phone numbers provided from a call tracking system (not shown) to enable callers to call advertisers.

The callers 110 and advertisers 112 may have mobile devices and computers that are utilized for communicating with each other and with the publishers 125 through the network 105. Any mobile devices may communicate wirelessly with a base station or access point using a wireless mobile telephone standard, such as the Global System for Mobile Communications (GSM), Long Term Evolution (LTE), or another wireless standard, such as IEEE 802.11, and the base station or access point may communicate with publishers 125 via the network 105. Computers may communicate through the network 105 using, for example, TCP/IP protocols.

Figure 2:
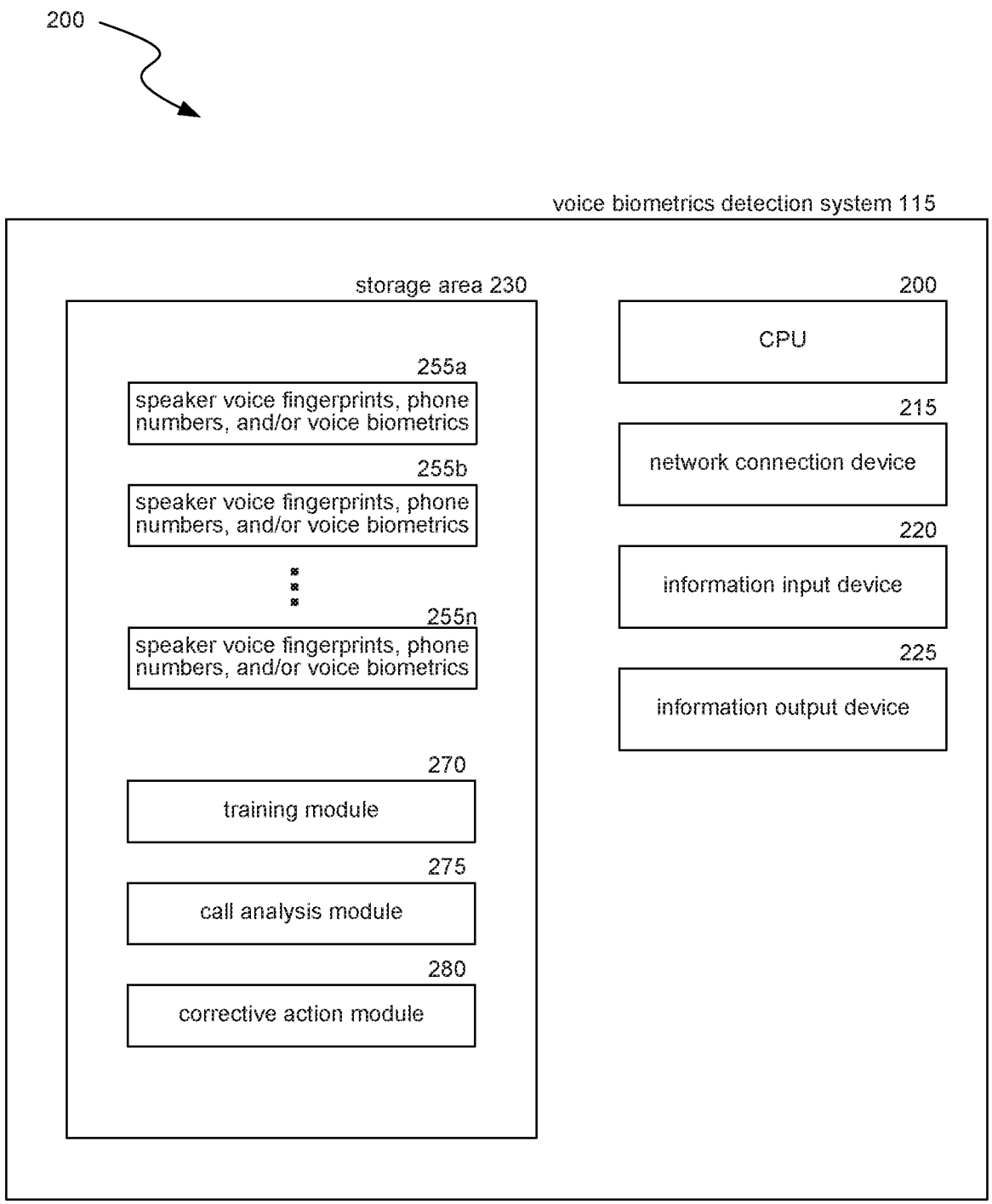
FIG. 2 is a block diagram illustrating components of a voice biometrics detection system.

FIG. 2 is a block diagram illustrating various components of the voice biometrics detection system 115. The voice biometrics detection system 115 includes a storage area 230. The storage area 230 includes software modules and data that, when executed or operated on by a processor, perform certain of the methods or functions described herein. The storage area may include components, subcomponents, or other logical entities that assist with or enable the performance of some or all of these methods or functions. For example, the storage area includes an AI training module 270 that uses a training dataset of known telephone calls or other known audio to generate a voice biometrics detection model for extracting voice biometrics of a speaker. The extracted voice biometrics are used to generate voice fingerprints characterizing speakers and differentiating between speakers. Additionally, the storage area includes a call analysis module 275 that uses the voice biometrics detection model to analyze a received call to identify (e.g., generate, extract, etc.) voice biometrics and generate voice fingerprints that are associated with the received call. The call analysis module 275 additionally determines a probability (e.g., by calculating a similarity score) of whether an identified voice fingerprint matches previously-stored voice fingerprints, and/or determines a number of times a voice fingerprint appears in phone calls that occurred concurrently or within a given amount of time. The storage area also includes a corrective action module 280 to assess whether a determined probability of a match and/or whether the number of times a speaker voice fingerprint appears in phones exceeds one or more thresholds. If the thresholds are exceeded, the corrective action module 280 takes appropriate corrective action such as by terminating a call, warning the call recipient about the likelihood that the caller is a spam or robocaller, providing the call recipient the opportunity to terminate the call, and so on. The operation of training module 270, call analysis module 275, and corrective action module 280 will each be described in more detail with respect to FIGS. 3 and 4.

The voice biometrics detection system 115 stores data 255a, 255b . . . 255n that characterizes one or more speakers. Data characterizing speakers can include raw audio data associated with each speaker, phone numbers or other unique identifiers for each speaker, voice biometrics extracted from audio data, voice fingerprints generated from the extracted voice biometrics, voice fingerprints of known speakers, and characterizations of caller type (e.g., legitimate callers, spam or robocallers, etc.) for each speaker. In some implementations, the voice biometrics detection system 115 can discard raw audio and identifying information of a caller after generating biometrics and fingerprints, and retain only biometrics and fingerprints for the caller for associating the caller with a determined caller type, for example, to avoid storage of private or confidential information. In some implementations, the voice biometrics detection system 115 can also discard biometrics and fingerprints for the caller, for example, when the system is configured to only detect live robocalls. In such implementations, the voice biometrics detection system 115 generates voice fingerprints to detect concurrent or near-concurrent instances of the same speaker in multiple phone calls, but the system may not store the generated voice fingerprints to detect the same caller in subsequent (i.e., non-concurrent) phone calls. Additionally, the voice biometrics detection system can store one or more received telephone calls that are to be analyzed for spam or robocaller activity. Additional information regarding the one or more sets of stored data 255a, 255b . . . 255n characterizing the speakers is described in more detail with respect to FIGS. 3 and 4. A person of ordinary skill will appreciate that storage area 230 may be volatile memory, non-volatile memory, a persistent storage device (for example, an optical drive, a magnetic hard drive, a tape of a tape library, etc.), or any combination thereof.

The voice biometrics detection system 115 further includes one or more central processing units (CPU) 200 for executing software stored in the storage area 230, and a computer-readable media drive for reading information or installing software from tangible computer-readable storage media, such as a floppy disk, a CD-ROM, a DVD, a USB flash drive, and/or other tangible computer-readable storage media. The voice biometrics detection system 115 also includes one or more of the following: a network connection device 215 for connecting to a network, an information input device 220 (for example, a mouse, a keyboard, etc.), and an information output device 225 (for example, a display).

Voice Biometrics Detection by Comparison to Known Speakers

Figure 3A:
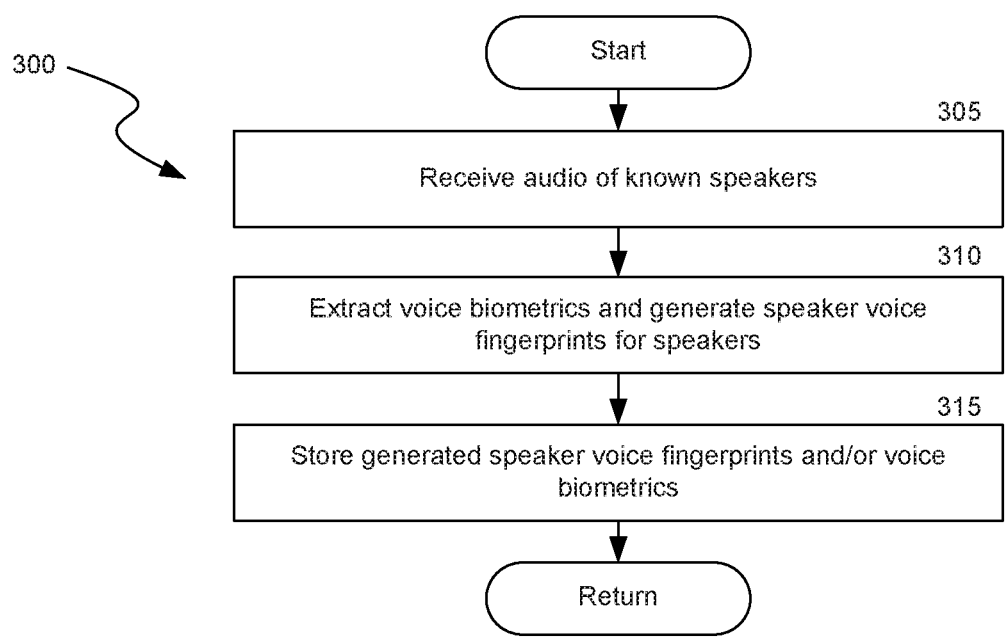
FIGS. 3A and 3B are flow diagrams illustrating a process for identifying a speaker in a phone call using voice fingerprinting.
Figure 3B:
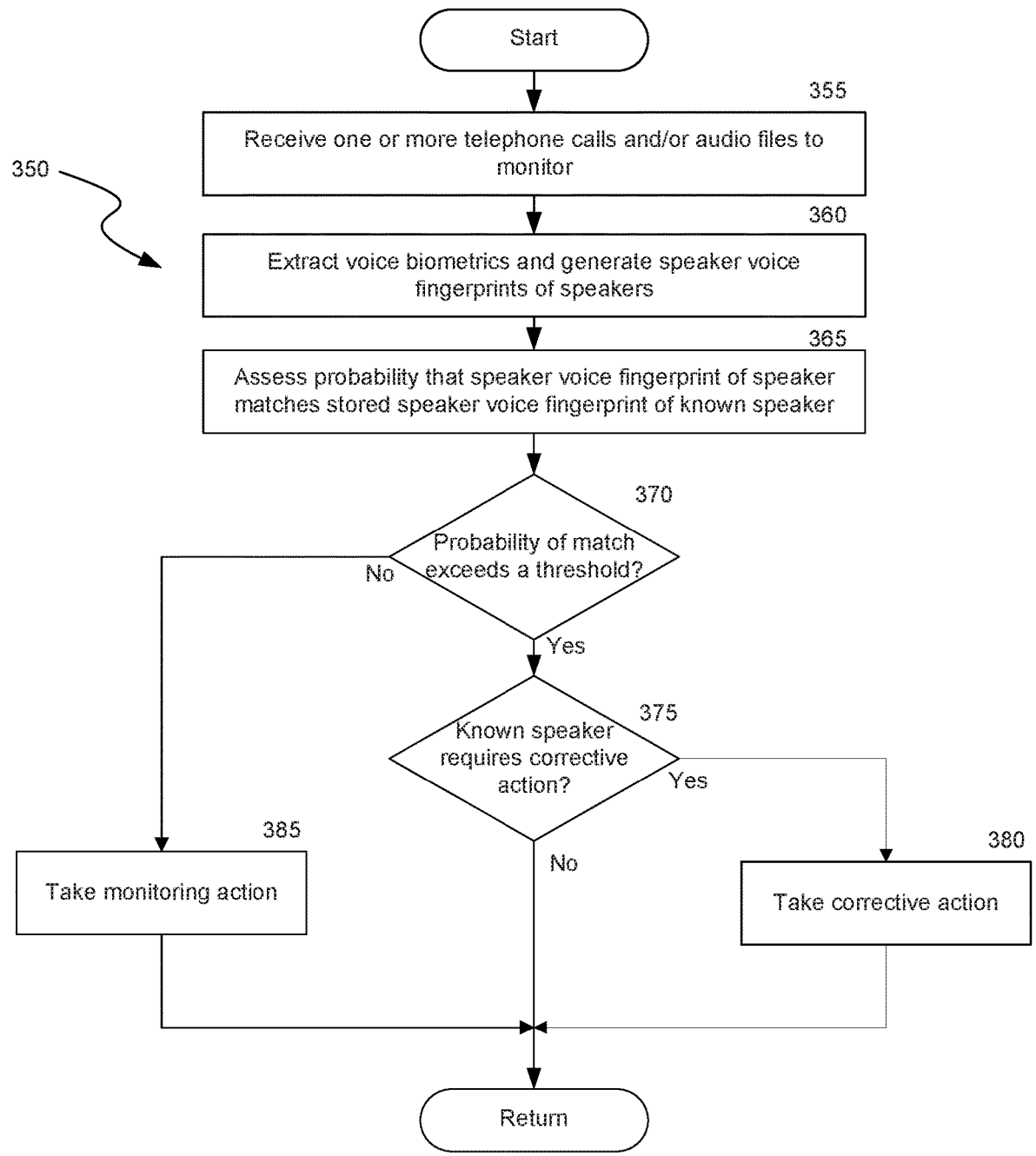

FIGS. 3A and 3B are flow diagrams illustrating processes 300 and 350 for identifying a speaker in a phone call using voice fingerprinting, configured in accordance with various embodiments of the system. The disclosed processes may be used to detect a known robocall based on a stored dataset of fingerprints associated with known robocalls or robocallers. In some embodiments, all or a subset of the one or more operations of the process 300 can be performed by components of a voice biometrics detection system.

Process 300 is executed by the system to generate a dataset of speaker fingerprints having an assigned caller type. At a block 305, the system receives audio of known speakers. The audio can be, for example, recorded phone calls or other audio data files. Each of the audio files associated with a speaker has an assigned caller type. For example, if the phone call or audio has been previously identified as spam (e.g., a known robocall), the speaker is classified as a spammer. If the phone call or audio has been previously identified as a legitimate conversation, the speaker is identified as a legitimate caller.

At a block 310, the system generates voice fingerprints by extracting (e.g., identifying, measuring, calculating, etc.) one or more voice biometrics for speakers in the audio received at block 305. Call audio data that is analyzed by the system can contain verbal and/or non-verbal speech uttered by humans or by machines configured to mimic or simulate the human voice. From the analyzed call audio data, the system extracts characteristics that identify or characterize the speaker including, for example, volume, pitch, speaking rate, pauses between each utterance, tonal properties, etc., that may be influenced, e.g., by the gender, age, ethnicity, language, and regional location of the speaker. In some embodiments, the system uses an AI-trained model to process and extract voice biometrics from the audio.

To train a model to extract voice biometrics from the audio, the system uses a dataset of known telephone calls as a training dataset. For example, the system can use a dataset of audio data (e.g., 200, 300, 400, 500 hours of audio data, etc.) in the training process, the dataset including a variety of speakers and speech content, as well as live or recorded audio and real or simulated human speech. Using traditional AI and neural net learning techniques, the system trains a voice biometrics detection model to identify distinguishing voice biometrics from audio. After being trained, the biometrics detection model can be used to identify biometrics that are used to characterize speakers from audio.

The biometrics detection model can be of any type, such as a universal background model (UBM), feed-forward (FF), long short-term Memory (LSTM), or any other model capable of generating voice biometrics. In an example implementation, the system generates biometrics according to the following equation:

$$v=F(o)$$

In this equation, v represents voice biometrics generated by the system, o represents spectral or cepstral features extracted from audio data, and F represents the biometrics detection model. In other words, the AI-trained biometrics detection model is applied to features, such as spectral or cepstral features, in audio data to generate voice biometrics that characterize a speaker in the audio. The voice biometrics are used to define a voice fingerprint for each speaker.

The system utilizes extracted biometrics for each speaker to generate speaker fingerprints. Typically, the system is able to identify sufficient biometrics from several seconds (e.g., 3-5 or more seconds) of received audio to characterize speakers, although a greater or lesser amount of audio data may be required for identification. Once extracted, the system generates voice fingerprints for each speaker as compressed and/or uncompressed data vectors or arrays of one or more voice biometrics. The system represents voice fingerprints using high-dimension vectors, in which each dimension can be represented as a float or double-precision floating point number. Vectors and values associated with vectors are associated with various characteristics that can be used to identify individual speakers in received audio. These characteristics can include, for example, pitch, speaking rate, volume, pauses between utterances, etc. Because the specific characteristics are trained in the neural network, however, the correlation between each characteristic and vector value is hidden by the system. Notably, however, a comparison of similarities between speakers can be made by calculating a difference between two or more fingerprint vectors.

At a block 315, the system stores the voice biometrics and/or the voice fingerprints extracted at block 310. In some embodiments, the system stores the voice biometrics and/or the voice fingerprints in one or more known voice biometrics datasets. Entries in the dataset associate a set of voice biometrics and/or a voice fingerprint with a speaker and a caller type for that speaker, such as spam caller, robocaller, or legitimate caller. In some embodiments, the dataset also includes a treatment for a particular caller, such as adding them to an "allowlist" to indicate that calls associated with that caller should be allowed to connect with a call recipient, or adding the caller to a "denylist" to indicate that calls associated with the caller should be blocked. The following table provides an example format of a stored characterization for each known speaker:

| Speaker ID | Voice Fingerprint | Caller Type | Date Added | Treatment |
|---|---|---|---|---|
| Speaker A | <vector A> | spammer | Mar. 16, 2020 | denylist |
| Speaker B | <vector B> | legitimate caller | Mar. 17, 2020 | allowlist |
| Speaker C | <vector C> | robocaller | Mar. 17, 2020 | allowlist |

It will be appreciated that the caller type does not always dictate the type of treatment for that caller. For example, although Speaker C is identified as a robocaller, the system has elected to treat Speaker C as an allowed caller because it is associated with a service that is considered to be a legitimate robocaller service (e.g., a dental service with reminder calls for appointments).

The dataset generated by blocks 305-315 can be modified over time, as new known speakers are added to the dataset, speakers are removed from the dataset, or the treatment of a speaker changes over time.

Once the dataset of known callers has been generated, the system 115 can use the dataset to take corrective action with respect to newly-received calls. FIG. 3B is a flow chart of a process 350 implemented by the system to process new calls. At a block 355, the system receives one or more phone calls or audio files to monitor. The one or more phone calls or audio files can be concurrently received by the system while a call is happening, allowing the system to analyze the call during the pendency of the call itself. Alternatively, a recorded copy of the one or more phone calls or audio files can be received such that the system analyzes the phone calls or audio files after a call has ended. When initially received, each of the one or more phone calls or audio files are unknown speakers. The system analyzes the received phone calls for indications that a caller to the individual or a business is a robocaller, spam caller, or other undesirable caller.

At a block 360, the system generates voice fingerprints for each speaker in the audio received at block 355 by extracting one or more voice biometrics characterizing each speaker. Because users of the system are primarily concerned with the identity of the calling party (and not the identity of the recipient of the call), the system typically generates speaker voice fingerprints for the calling speaker and ignores the audio associated with the called party. In other cases, the system generates speaker voice fingerprints for both the calling party as well as the recipient. The system generates voice fingerprints in a manner similar to the process described herein at block 310, according to the voice biometrics detection model(s) generated by the system. The fingerprint may be generated during the pendency of a call (e.g., by generating a speaker voice fingerprint in seconds or minutes, while a caller is still on the line).

At a block 365, the system computes one or more probabilities, such as by calculating a similarity score, that a voice fingerprint generated of the unknown caller at block 360 matches a stored voice fingerprint of a known caller. The stored voice fingerprint may be associated with, for example, a known spam caller, a known robocaller, a known legitimate caller, etc. Additionally, the known caller may be on the allowlist or the denylist. In some embodiments, the system searches a dataset comprising voice fingerprints for known callers and/or voice biometrics of known speakers for potential matches to the voice fingerprint generated at block 360. The system can find closely matching fingerprints by calculating a distance between fingerprint vectors using any common mathematical technique such as cosine similarity, Euclidean distance, Mahalanobis distance, probabilistic linear discriminant analysis (PLDA), etc., and identifying vectors with the least distance. The system identifies a subset of voice fingerprints stored in the dataset that are potential matches and computes a probability of match for each speaker voice fingerprint in the subset. In other embodiments, the system computes a probability of match for every speaker voice fingerprint stored in the dataset.

At a decision block 370, the system compares the one or more probabilities computed at block 365 to a threshold. The threshold can represent a confidence level above which the system identifies a match between a speaker voice fingerprint generated at block 360 and a stored speaker voice fingerprint associated with a known caller. Example thresholds include 75%, 80%, 90%, 95%, 98%, 99%, and 100%, among others. Thresholds can be configurable, based on semi-supervised training of the system, and/or empirically determined, such that the threshold differentiates between speakers to an acceptable degree of accuracy corresponding to the threshold. When the calculated probability exceeds the threshold, the system treats the newly-received voice fingerprint as having matched the previously-identified known speaker voice fingerprint.

If the system determines that a probability computed at block 365 meets or exceeds the threshold at block 370, then the system concludes that the speaker corresponding to the voice fingerprint generated at block 360 matches the known speaker corresponding to the stored speaker voice fingerprint. In other words, the system determines that the speaker associated with the voice fingerprint generated at block 360 is likely the same as a particular known speaker represented in the matching voice fingerprint.

At decision block 375, the system determines whether a corrective action is needed based on the identified known speaker. If the identified known speaker is a legitimate caller, for example, and on an allowlist, no corrective action is needed to be taken. In that case, processing terminates. In the event that the known speaker corresponding to the voice fingerprint stored at block 315 is a known spam caller or robocaller, however, and on a denylist, processing continues to block 380.

At block 380 the system takes an appropriate corrective action depending on the identity of the known speaker and the system settings. Corrective action can include (a) generating, transmitting, and/or displaying an audio or visual warning or notification to a party of the phone call that the call is spam, (b) automatically disconnecting the phone call, or (c) requesting the receiving party for authorization to disconnect the phone call. For example, the system can transmit an audio warning or display a visual warning on a screen to warn a call recipient that he or she is likely interacting with a spam caller, robocaller, etc. The system can also, for example, automatically disconnect the phone call upon determining or confirming that the call is a spam call, robocall, etc. In some embodiments, the system can transmit the call recipient a message indicating that the call is likely a spam caller, robocaller, etc. and requesting permission to disconnect the call. The message may be transmitted to the call recipient via a message in a graphical user interface (GUI), a message sent via a service or protocol (e.g., text message, Short Message Service (SMS), Rich Communication Service (RCS), etc.), and so forth. In response to the sent message, the system receives a message from the call recipient that either confirms that the call should be disconnected or indicates that the call should be allowed to proceed.

If the system determines that a probability computed at block 365 does not meet or exceed the threshold at block 370, then the system concludes that the speaker corresponding to the voice fingerprint is still indeterminate. That is, the system is unable to associate the voice fingerprint with a known caller. In that case, processing continues to block 385 where the system takes a monitoring action. A monitoring actionc can include sending a caller confirmation request to a call recipient following a call and requesting that the call recipient characterize the call with a caller type (e.g., legitimate caller, spam caller, robocaller, etc.). In some embodiments, corrective action includes generating and transmitting to a call recipient a caller confirmation request, such as a robocaller confirmation request. The caller confirmation request informs a call recipient that a speaker in a telephone call is likely associated with a known caller type (e.g., spam caller, legitimate caller, robocaller, etc.), and requests confirmation from the call recipient that the caller is of the known caller type. The system can transmit the caller confirmation request to the call recipient via a message in a graphical user interface (GUI), a message transmitted via a service or protocol (e.g., text message, Short Message Service (SMS), Rich Communication Service (RCS), etc.), an email, and so forth. In response to the caller confirmation request, the system receives a message from the call recipient that either confirms or denies that the caller is of the identified caller type. The call recipient may provide the return message to the system by selecting a control within the presented GUI of the original caller confirmation request, by sending a responsive text, SMS, or RCS communication, by sending a responsive email, and so forth. In response to the caller confirmation request, the system thereby receives an indication from the call recipient with an appropriate caller type.

In some embodiments, the monitoring action can be taken depending on the proximity of the probability computed at block 365 to the threshold at block 370. If the computed probability is close to, but not above the threshold, there is a greater likelihood that the corresponding caller may be a robocaller or spam call. In that case, the monitoring action can be taken by the system to confirm the caller type with the call recipient. In contrast, if the computed probability is very low at block 365, the likelihood that the corresponding caller is a robocaller or spam caller is remote. In that case, the system may take no monitoring action.

In some embodiments, the monitoring action can include analyzing interactions associated with the caller voice fingerprint across multiple calls or multiple channels of a call. The system can analyze received audio input for various information and data such as a duration that a speaker talks in the audio input, data from two or more channels of a phone call (e.g., whether multiple speakers or callers on different channels of the call interact with one another, such as a customer and agent and/or other characteristics of audio and voice signal pattern-based analysis). When audio of a phone call is recorded and/or transcribed, the information and data can be generated via natural language processing (NLP) and/or natural language understanding (NLU) and used to detect real conversation (e.g., conversation that includes both sides on the phone call engaged in meaningful discussion and/or about meaningful topics). For example, the system can determine that a caller is legitimate when the system detects that the call recipient interacts with the caller for an extended period, e.g., by having in interactive conversation, responding to questions or prompts, or otherwise responding to the call. In contrast, the system can identify a call as illegitimate, for example, if the call recipient does not interact with the caller (e.g., immediately disconnects the call without speaking or otherwise responding to the caller).

Based on the monitoring actions, the system can assign a caller type and a treatment for the caller type to the caller voice fingerprint. That is, the system can create a new known caller entry in the maintained dataset generated in block 315. Once a caller has been added to the known caller dataset, the system can treat future calls having a voice fingerprint matching the stored voice fingerprint in accordance with the corrective actions described herein.

Although the operations of the processes 300 and 350 are discussed and illustrated in a particular order, the processes are not so limited. In some embodiments, the processes may perform operations in a different order than described herein. Furthermore, a person skilled in the art will readily recognize that the processes can be altered and still remain within these and other embodiments of the system. For example, one or more operations illustrated in FIGS. 3A and 3B can be omitted from and/or repeated within the processes in some embodiments.

Additional or alternative operations not depicted in FIG. 3 can be included in the example process 300 in accordance with various embodiments of the system. For example, the system can take into account the age of the analyzed data in determining whether a caller voice fingerprint should be added to the "allowlist" or "denylist." For example, older analyzed data can be weighted less than newer analyzed data when assigning a characterization to a particular voice fingerprint. Additionally, the system can take into account the length of time that a particular voice fingerprint has been on the allowlist or denylist. On a periodic basis, calls associated with a voice fingerprint can be reassessed to ensure that the voice fingerprint continues to be associated with behaviors consistent with the applied characterization. In other words, the system can update a speaker or caller "denylist" or "allowlist" from time to time to remove voice fingerprints from either list.

Furthermore, the process 300 can take into account additional or alternative factors in identifying unknown callers and/or taking corrective without deviating from the teachings of the present disclosure. For example, an unknown speaker can be identified, in part, based on other identifying information such as a phone number or other identifier associated with a caller, speaker, or user.

Voice Biometrics Identification by Comparing Speakers Across Multiple Calls

Figure 4:
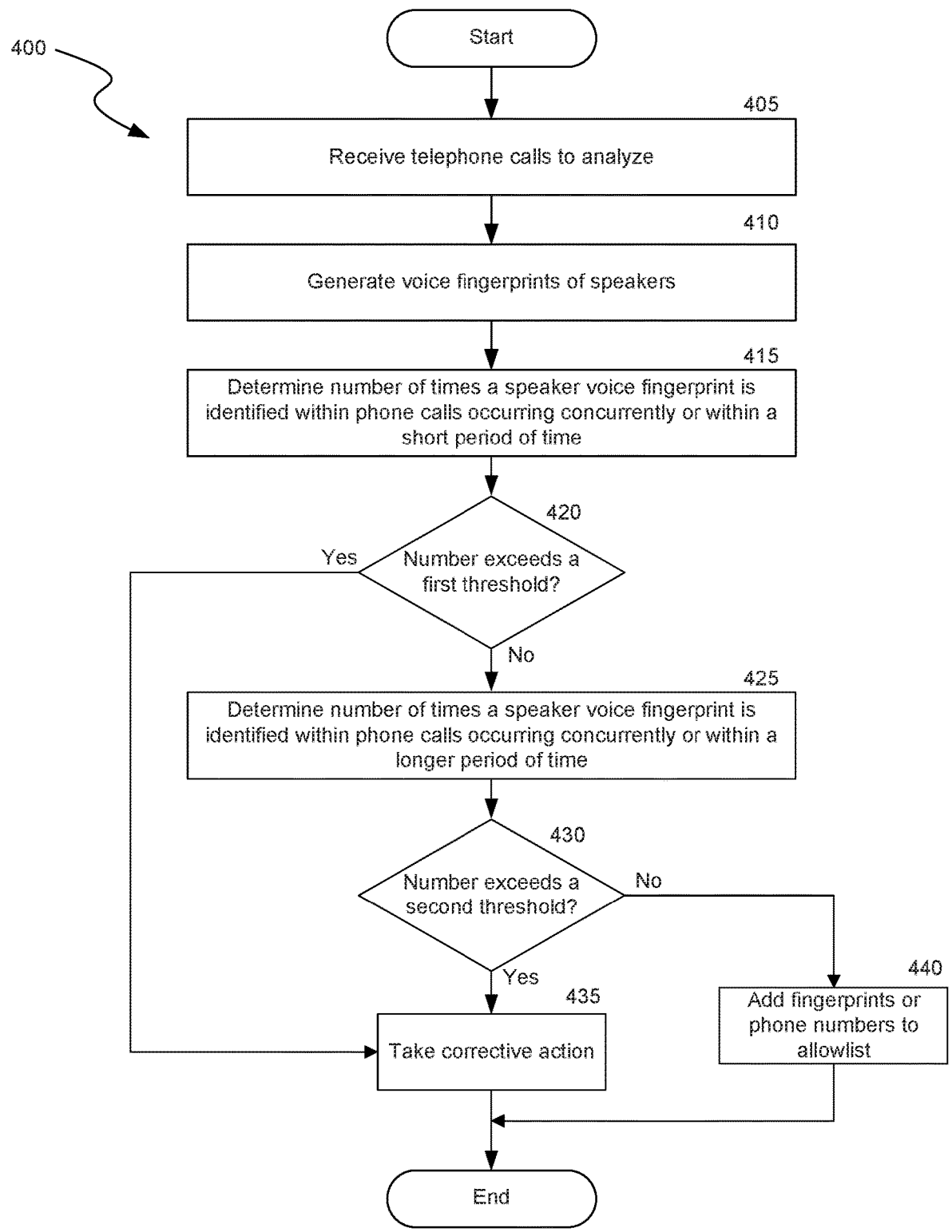
FIG. 4 is a flow diagram illustrating a process for identifying a robocaller or spam caller in phone calls using voice fingerprinting.

FIG. 4 is a flow diagram illustrating a process 400 executed by the system for identifying a robocaller or spam caller in phone calls using voice fingerprinting. The disclosed process detects new or unknown robocallers based on frequency of detection of a common voice fingerprint over one or more analyzed time periods. In some embodiments, all or a subset of the one or more steps of the process 400 can be performed by components of the voice biometrics detection system.

At a block 405, the system receives a set of phone calls to analyze. The phone calls can be "live," such that the process 400 monitors the audio signal of each phone call and analyzes the call while the call is happening. Alternatively or additionally, the phone calls can be received as recorded audio files such that the process 400 processes each phone call in a delayed fashion (e.g., with a time delay, but during the pendency of a call) or each call after the call has ended. The phone calls can be phone calls that occur concurrently or within a short time period (e.g., within a few seconds or minutes) of one another. In these and other embodiments, the phone calls can be phone calls that occur concurrently or within a longer time period (e.g., within several minutes, hours, days, weeks, etc.) of one another. The phone calls can be phone calls of known and/or unknown speakers.

At a block 410, the system generates voice fingerprints by extracting (e.g., identifying, measuring, calculating, etc.) one or more voice biometrics characterizing speakers in the received audio. Phone calls typically have two channels, one associated with the caller and the other associated with the called party. In some embodiments, the process 400 generates voice fingerprints of speaking parties on only one channel of the phone call (e.g., on only the caller side). The system typically focuses its analysis on the caller since the called party is typically a known individual. Voice fingerprints are generated using the voice biometrics detection model(s) generated by the system. The system expresses generated voice fingerprints as compressed and/or uncompressed data vectors or arrays of one or more voice biometrics, as described herein. After generating a voice fingerprint, the system stores the generated voice fingerprint in association with one or more time stamps reflecting a start time of the call, an end time of the call, or both the start and end time of the call. The voice fingerprint and corresponding timestamps are stored by the system in a dataset or database.

At a block 415, the system selects a short time period and corresponding set of received calls to analyze. For example, the system can elect to analyze all calls received within a one-minute period, five-minute period, 15-minute period, an hour period, etc. Using time stamps associated with the voice fingerprints, the system identifies all calls that fall within the selected short time period. Once the calls are identified, the system determines the number of times that each voice fingerprint is detected during the selected period. The operation of block 415 is used to identify when a material number of calls include the same speaker during the selected period of time. For example, the operation at block 415 can detect if the same speaker is present in dozens, hundreds, thousands of calls per minute, per hour, etc. By reviewing calls within a selected time period, the system can detect if there are multiple occurrences of the same voice fingerprint at or near the same time. For example, the detection of the same voiceprint at the same time on multiple phone calls is indicative that the speaking party is likely a robocaller or other simulated caller.

At a block 420, the system determines whether the number of times each voice fingerprint appears in a selected short time period, as determined at block 415, exceeds a first threshold. In some embodiments, the first threshold represents a maximum number of phone calls a caller might legitimately place within the selected period of time. Example first thresholds include two calls, three calls, five calls, ten calls, etc. that occur within a few seconds or minutes. If the system determines that the number meets or exceeds the first threshold, the system designates the corresponding calls as likely spam and the caller identified by the voice fingerprint as a likely robocaller (e.g., that a batch tool or auto-dialer was used to generate robocalls). If the number exceeds the threshold at decision block 420, processing continues to block 435 where the system takes corrective action. Otherwise, the processing continues to block 425. The first threshold associated with the short time period represents a number of calls beyond which it is not possible or likely that the calls are placed by a single person. The short time period and first threshold can be adjusted by the system according to an empirically determined threshold. As one example, a threshold of 5, 10, 20, or 30 calls may be associated with a short time period of one minute. If a number of calls associated with the same voice fingerprint exceeds this threshold for the short time period, then the system determines that the caller associated with the voice fingerprint is a robocaller (e.g., because the calls are generated from a recording, using a computer, or using simulated speech, etc.).

At a block 425, the system selects a long time period and corresponding set of received calls to analyze. For example, the system may elect to analyze all calls received within an hour period, a 24-hour period, a week, etc. Using time stamps associated with the voice fingerprints, the system identifies all calls that fall within the selected long time period. Once the calls are identified, the system determines the number of times that each voice fingerprint is detected during the selected period. The operation of block 425 is used to identify when a material number of calls include the same speaker over a longer time frame. For example, the operation at block 415 can detect if the same speaker is present in hundreds or thousands of calls per day or week.

At a block 430, the process 400 determines if the number of times each voice fingerprint appears in a selected long time period, as determined at block 425, exceeds a second threshold. The second threshold represents a maximum number of phone calls a human caller might legitimately place within the longer period of time. Example second thresholds include 25 calls, 100 calls, 250 calls, etc. within several hours, days, weeks, etc. For example, the longer time period of 5 days may be associated with a second threshold of 1000 calls, indicating that a number of calls beyond this threshold are likely robocalls (e.g., generated from recordings, computers, using simulated speech, etc.). The system can adjust the second threshold depending on the characteristics of the observed traffic. If the system determines that the number meets or exceeds the second threshold, system designates the corresponding calls as likely spam and the caller identified by the voice fingerprint as a likely robocaller (e.g., that a batch tool or auto-dialer was used to generate robocalls). If the number exceeds the second threshold at decision block 430, processing continues to block 435 where the system takes corrective action. Otherwise, the processing continues to block 440.

At a block 435, the system takes corrective action. In some embodiments, the system takes corrective action by adding the voice fingerprints, corresponding phone numbers or other identifiers from calls that met or exceeded the first threshold or second thresholds to the denylist. That is, the system disconnects current phone calls (when a likely robocaller is detected during the call) or blocks future phone calls associated with voice fingerprints, phone numbers, or other identifiers from calls that met or exceeded the first or second thresholds. As described herein, corrective action can include generating a warning or indication to a user, providing a user the opportunity to terminate a call, automatically terminating or blocking a call, and so on. In some embodiments, the system may forgo corrective action, e.g., if a speaker is detected as being associated with a robocaller with a legitimate purpose (e.g., appointment reminders, and so forth).

If corrective action is not taken for a particular voice fingerprint, at a block 440 the system can add the voice fingerprints, corresponding phone numbers, or other identifiers associated with calls that did not meet or exceed the first and second thresholds to the allowlist. That is, the system will allow current or future phone calls associated with voice fingerprints, phone numbers, or other identifiers for which call quantities do not exceed the first and second thresholds to proceed in an unobstructed fashion.

Although the operations of the process 400 are discussed and illustrated in a particular order, the process 400 is not so limited. In some embodiments, the process 400 may perform operations in a different order. For example, the process 400 may perform blocks 425 and/or 430 before, during, and/or after performing blocks 415 and/or 420. Furthermore, a person skilled in the art will readily recognize that the process 400 can be altered and still remain within these and other embodiments of the system. For example, one or more operations (e.g., blocks 415 and 420, and/or blocks 425 and 430) illustrated in FIG. 4 can be omitted from the process 400.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Where the context permits, words in the Detailed Description using the singular or plural number may also include the plural or singular number respectively.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computer-implemented method for identifying a robocaller in a telephony network, the method comprising:
    receiving audio input representing a plurality of telephone calls made in a telephony network during a time period;
    for at least some of the plurality of telephone calls:
        analyzing, based on a voice biometrics detection model, a portion of the received audio input corresponding to a telephone call to identify one or more biometric indicators characterizing a speaker in the analyzed telephone call;
        generating, based on the identified one or more biometric indicators, a voice fingerprint characterizing the speaker in the analyzed telephone call; and
        storing in a dataset an indication of the voice fingerprint and a time of the analyzed telephone call within the time period;
    determining, within an analyzed timeframe of the dataset, a frequency of occurrence of each voice fingerprint within the dataset; and
    characterizing a voice fingerprint within the dataset as being associated with a robocaller when the frequency of occurrence exceeds a threshold call quantity limit.

2. The method of claim 1, further comprising:
    receiving audio input representing a subsequent telephone call;
    generating a voice fingerprint associated with the subsequent telephone call;
    searching the dataset to identify the generated voice fingerprint; and
    taking a corrective action associated with the analyzed telephone call when the generated voice fingerprint is identified as a robocaller in the dataset.

3. The method of claim 2, wherein the corrective action includes is terminating the subsequent telephone call.

4. The method of claim 1, wherein the voice biometrics detection model is generated based on one or more artificial intelligence (AI) speech data processing models.

5. The method of claim 1, wherein the one or more biometric indicators characterizing a speaker in the analyzed telephone call include one or more of volume, speaking rate, pitch, length of pauses, or duration of pauses.

6. The method of claim 1, wherein the received audio input includes a caller channel and a called channel, and wherein the one or biometric indicators are identified for a speaker only on the caller channel of the analyzed telephone call.

7. The method of claim 1, wherein determining a frequency of occurrence of each voice fingerprint within the dataset includes calculating a probability that two or more voice fingerprints within the dataset correspond to a common speaker.

8. The method of claim 1, wherein the analyzed timeframe and the time period are the same.

9. A computer-implemented method for identifying a caller in a telephone call, the method comprising:
    receiving an audio input directed to a call recipient, wherein the audio input includes real or simulated human speech;
    analyzing, based on a voice biometrics detection model, the received audio input to identify one or more biometric indicators characterizing a speaker in the audio input;
    generating a speaker voice fingerprint based on the one or more biometric indicators characterizing the speaker;
    querying a dataset comprising a plurality of biometric voice fingerprints corresponding to known callers to determine whether the generated speaker fingerprint matches one or more of the plurality of biometric voice fingerprints corresponding to known callers;
    generating and transmitting to the call recipient, in response to determining that the generated speaker voice fingerprint does not match one or more of the plurality of biometric voice fingerprints corresponding to known callers, a caller confirmation request,
        wherein the caller confirmation requests that the call recipient provide an indication whether the speaker in the received call is associated with a known caller type;
    receiving, in response to the caller confirmation request, an indication from the call recipient that the speaker in the audio input is associated with the known caller type;
    adding, in response to the received indication, the generated speaker voice fingerprint to the dataset; and
    associating, in the dataset, the generated speaker voice fingerprint with the known caller type.

10. The method of claim 9, wherein the voice biometrics detection model is generated based on one or more artificial intelligence (AI) speech data processing models, and wherein the one or more biometric indicators characterizing a speaker in the audio input include volume, speaking rate, pitch, length of pauses, and duration of pauses.

11. The method of claim 9, wherein the known caller type is a type of caller classified as a legitimate caller.

12. The method of claim 9, wherein the known caller type is a type of caller classified as a spam caller or robocaller.

13. The method of claim 9, wherein the caller confirmation request is transmitted to the call recipient via a graphical user interface (GUI), a text message, or an email.

14. A non-transitory computer-readable medium comprising instructions configured to cause one or more processors to perform a method for identifying a robocaller in a telephony network, the method comprising:
    receiving audio input representing a plurality of telephone calls made in a telephony network during a defined time period;
    for at least some of the plurality of telephone calls:
        analyzing, based on a voice biometrics detection model, a portion of the received audio input corresponding to a telephone call to identify one or more biometric indicators characterizing a speaker in the analyzed telephone call;
        generating, based on the identified one or more biometric indicators, a voice fingerprint characterizing the speaker in the analyzed telephone call; and storing in a dataset an indication of the voice fingerprint and a time of the analyzed telephone call within the defined time period;

determining, within an analyzed timeframe of the dataset, a frequency of occurrence of each voice fingerprint within the dataset; and characterizing a voice fingerprint within the dataset as being associated with a robocaller when the frequency of occurrence exceeds a threshold call quantity limit.

15. The computer-readable medium of claim 14, wherein the method is performed during an analyzed telephone call, and wherein a voice fingerprint characterizing a speaker in the analyzed telephone call is characterized as being associated with a robocaller based on the frequency of occurrence of the voice fingerprint exceeding the threshold call quantity limit, the method further comprising:

taking corrective action to terminate the analyzed telephone call.

16. The computer-readable medium of claim 15, wherein taking corrective action to terminate the analyzed telephone call includes generating and transmitting to a user a robocaller confirmation request, and receiving from the user an indication in response to the robocaller confirmation request.

17. The computer-readable medium of claim 14, wherein the voice biometrics detection model is generated based on one or more artificial intelligence (AI) speech data processing models, and wherein the one or more biometric indicators characterizing a speaker in the analyzed telephone call include volume, speaking rate, pitch, length of pauses, and duration of pauses.

18. The computer-readable medium of claim 14, wherein analyzing a portion of the received audio input corresponding to a telephone call to identify one or more biometric indicators characterizing a speaker in the analyzed telephone call includes identifying a caller channel and a called channel within the analyzed telephone call, and wherein the one or biometric indicators are identified for a speaker only on the caller channel of the analyzed telephone call.

19. The computer-readable medium of claim 14, wherein determining a frequency of occurrence of each voice fingerprint within the dataset includes calculating a probability that two or more voice fingerprints within the dataset correspond to a common speaker.

20. The computer-readable medium of claim 14, wherein the analyzed timeframe and the defined time period are the same.

* * * * *